United States Patent [19]

Corsi et al.

[11] 4,132,421
[45] Jan. 2, 1979

[54] SHAFT SEAL

[75] Inventors: George L. Corsi, Southfield; Stanley N. Smith, Farmington, both of Mich.

[73] Assignee: Federal-Mogul Corporation, Detroit, Mich.

[21] Appl. No.: 822,110

[22] Filed: Aug. 5, 1977

Related U.S. Application Data

[63] Continuation of Ser. No. 550,066, Feb. 14, 1975, abandoned.

[51] Int. Cl.² .............................................. F16J 15/32
[52] U.S. Cl. .................................... 277/166; 277/134; 277/182; 277/186; 277/215; 277/227
[58] Field of Search ............... 277/227, 215, 184, 183, 277/186, 166, 207 R, 233, 165, 182, 134

[56] References Cited

U.S. PATENT DOCUMENTS

| 2,157,995 | 5/1939 | Boyd | 277/184 |
| 2,183,004 | 12/1939 | Boyd | 277/184 |
| 2,264,413 | 12/1941 | Siegerist | 277/182 |
| 2,819,106 | 1/1958 | Vorhees | 277/182 |
| 3,521,890 | 7/1970 | Holmes | 277/165 |
| 3,549,445 | 12/1970 | McMahon | 277/184 |
| 3,924,861 | 12/1975 | Szepesvary | 277/185 |

FOREIGN PATENT DOCUMENTS 1213182 3/1966 Fed. Rep. of Germany ........... 277/153

Primary Examiner—Richard E. Aegerter
Assistant Examiner—L. Footland
Attorney, Agent, or Firm—Robert F. Hess

[57] ABSTRACT

An improved metal encased radial-type oil shaft seal of either single or dual lip construction wherein the primary seal lip is polytetrafluoroethylene — or the like and is bonded and mechanically interlocked to the metal case by an elastomeric material.

5 Claims, 5 Drawing Figures

SHAFT SEAL

This is a continuation, of application Ser. No. 550,066, filed Feb. 14, 1975, now abandoned.

BACKGROUND OF THE INVENTION

This invention relates to oil seals, particularly shaft seals wherein the primary sealing lip element is an annular wafer shaped article which completely surrounds the shaft to be sealed and is in light engagement therewith at its inner annulus, or seal lip as it is commonly referred to.

Typically the aforesaid primary sealing lip element is part of a metal cased assembly which is press fitted into a shaped housing bore. The entire metal cased seal assembly ordinarily comprises a cup shaped metal case having an outer cylindrical portion adapted for press fitted engagement with the bore of the housing and a radical flange extending radially inward from one end thereof, a seal element, a gasket between the seal element and radial flange of the cup shaped metal case, and a second metal case having a radial portion backing up the seal element axially inward of the first metal case radial flange. The two metal cases are crimped or otherwise tightly secured to one another in such manner that the seal element is likewise secured between the radial flanges of the two metal case member.

Typical of seals of this construction is that shown in copending patent application Ser. No. 426,373, filed Dec. 19, 1973, now U.S. Pat. No. 3,857,156, and assigned to the assignee of this invention.

The latest development in this type of seal includes making the primary sealing element of polytetrafluoroethylene or the like and incorporating therein unidirectional and bidirectional hydrodynamic oil feedback features which prevent oil from leaking past the lip portion of the sealing element. For example, a spiral groove or flute located on the air side of the sealing element in the area of the lip portion will prevent oil leakage in one direction of shaft rotation such as shown in the aforesaid pending patent application. Similarly, bidirectional hydrodynamic features can be provided with sealing element configurations such as shown in copending patent application Ser. No. 541,926, filed Jan. 17, 1975, now U.S. Pat. No. 3,984,113 and assigned to the assignee of this invention.

These seals work well for the intended purpose but assembly includes a great number of separate fabrication operations. Further, the design of such seals does not lend itself to adaptation for a dual lip seal and consequently their use is limited. Also, applicants desired a design which would reduce the raw material requirements so as to minimize as much as possible the current problems of availability and cost.

SUMMARY OF THE INVENTION

In the present invention an oil seal is constructed of a single metal case member and a wafer like annular lip seal element secured to the metal case by an elastomeric material. The metal case includes an outer cylindrical portion and radial flange depending inward from one end thereof which is of stepped configuration. This in turn provides in effect a counterbore in which is accurately located the radially outermost portion of the seal element as well as the elastomeric bonding material, or its equivalent. The securement of the lip seal element to the case is enhanced by providing a plurality of holes or slots in the seal element in the area where it is backed by the metal case so that the elastomer fills such holes. This gives a mechanical interlock with the seal element as well as an increase in the bonding strength with the metal case.

DETAILED DESCRIPTION OF THE INVENTION

Figure 1:
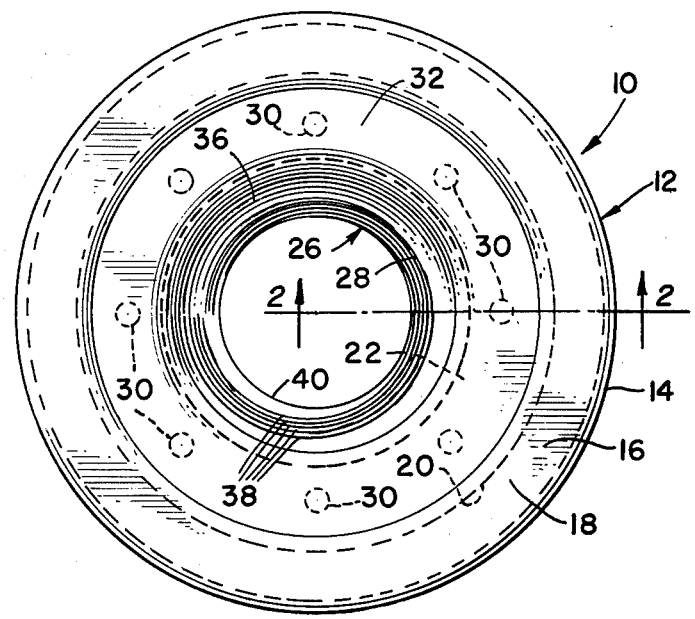
FIG. 1 is a view in end elevation of a radial type shaft seal embodying the principles of the invention.
Figure 2:
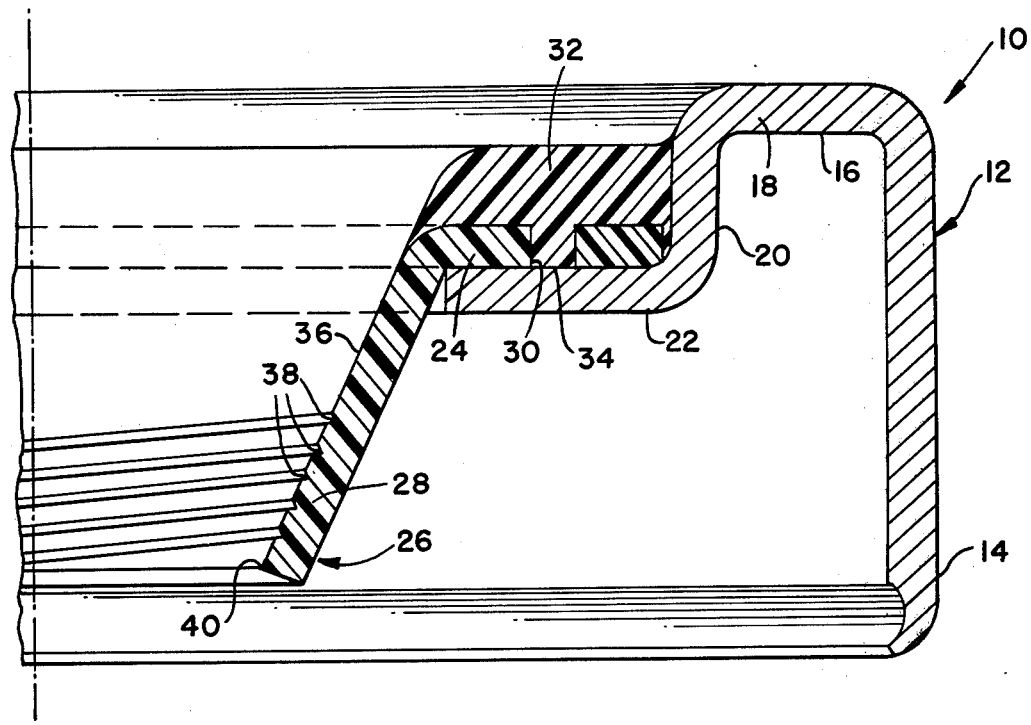
FIG. 2 is an enlarged view in section taken through the seal along line 2—2 in FIG. 1.

FIGS. 1 and 2 show a radial type oil shaft seal of one preferred form embodying the principles of the invention. The seal 10 is of the single lip type and includes a single metal case 12 having a radially outermost axially extending cylindrical portion 14 and a stepped radial flange 16 extending inwardly from one end thereof. Radial flange 16 includes lower radial portion 18, an intermediate axially extending cylindrical portion 20, and an upper radial flange portion 22 depending in from the axial inboard end of axially extending portion 20. These latter two members, namely the intermediate cylindrical portion 20 and upper radial portion 22 form a counterbore. Located within this counterbore and secured against flange portion 22 by means of an elastomeric bond is a flat radial outer portion 24 of seal element 26, preferably made of polytetrafluoroethylene, and which also has a frustoconical portion 28 which constitutes the lip portion of the seal element. The flat radial outer portion 24 includes a plurality of holes 30 equally spaced about its circumference and filled with an elastomeric material, (preferably Buna-n), which forms the elastomeric radial reinforcement member 32. The elastomeric member 32 is bonded to the intermediate cylindrical portion 20 of the metal case at its circumference as well as at each interface 34 with the upper radial flange portion 22.

As desirable for some applications, the air side surface 36 of the frustoconical portion 28 of seal element 26 may have a spiral groove 38 leading outward from innermost edge 40 of the seal. This groove 38 is made so that during rotation of the shaft in a particular direction, the groove tends to return any oil which may leak along the shaft, due to scratches in the shaft or minor imperfections in the shaft or even in the shaft sealing element, though most of the leakage occurs in this instance from the shaft imperfections. As in all hydrodynamic seals, the purpose of the groove 38 is to return the oil beneath the seal lip 40 and back to the oil side of the seal.

When the seal 10 is installed, there is shaft interference which flexes the inner portion 28 and makes a portion thereof substantially cylindrical for a short distance; that is why the spiral groove 38 extends a substantial distance along the face, because the degree of shaft interference is somewhat indeterminate.

It should perhaps be emphasized that the stepped configuration of radial flange 16 is important for several reasons. First of all, it provides a method of accurately locating the flat radial outer portion 24 of the seal element which it will be noted has already been pierced to its final inner diameter. Any eccentricity or offset in location of the seal element within the metal case will naturally result in the lip portion of the seal element being offset from the shaft it is to seal. And this of course might well result in an oil leak. Another advantage resulting from the stepped configuration is that this accurate location of the seal element can be effected with much less material usage than would be required if it were necessary to locate the seal element with respect to the radially outermost cylindrical portion 14. Less bonding material 32 is required for the same reason. It is likewise obvious that the stepped configuration allows metal case 12 to be sized consistent with those of conventional molded lip seals and therefor the seal of our invention can be used as a replacement thereof without the necessity of further design changes, such as resizing the shaft housing seal bore, and the like.

Figure 3:
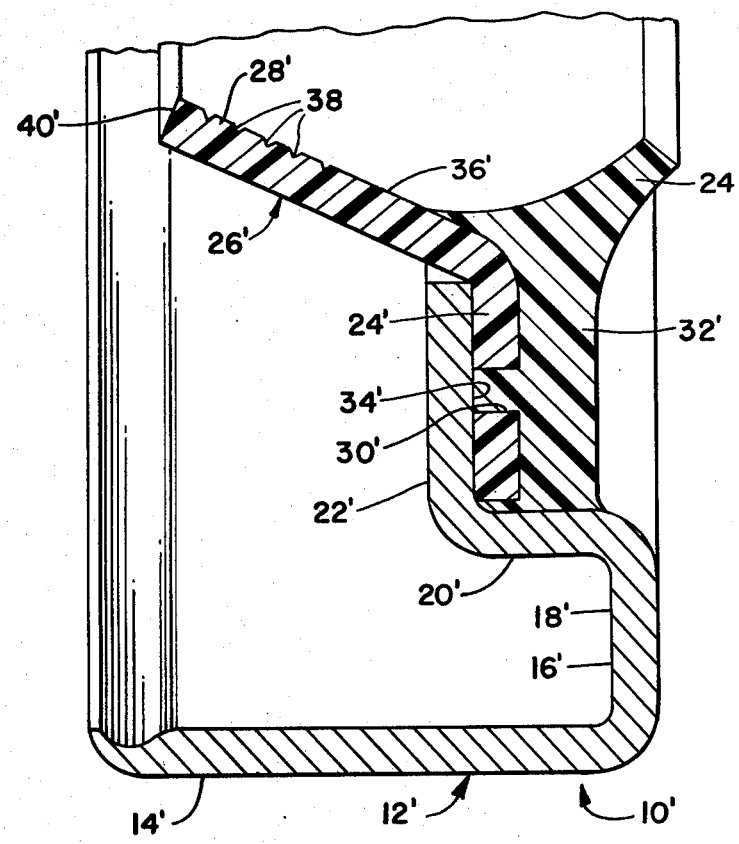
FIG. 3 is an enlarged view in section similar to that of FIG. 2 and illustrating a modification thereof commonly referred to as a dual lip cup case seal.

FIG. 3 shows a second preferred embodiment of an oil shaft embodying the principles of the invention. It is similar in construction in all respects, with one exception, to the seal shown in FIGS. 1 and 2. Therefore like numerals are used to indicate like features. The distinguishing feature of the seal of FIG. 3 is that it is a dual lip type seal. The secondary lip 42, which is provided for excluding dust and dirt from the primary seal lip, may be an integral portion of elastomeric member 32. As seen it is likewise frustoconical in shape but extends in an axial opposite direction than frustoconical portion 28. The lip 42 extends downward in the direction of the shaft on which it is to be installed a distance sufficient to make light sealing contact therewith. Lip 42 need not extend inward as far as innermost end 40 of seal element 26, and it is preferred that it does not do so.

Figure 4:
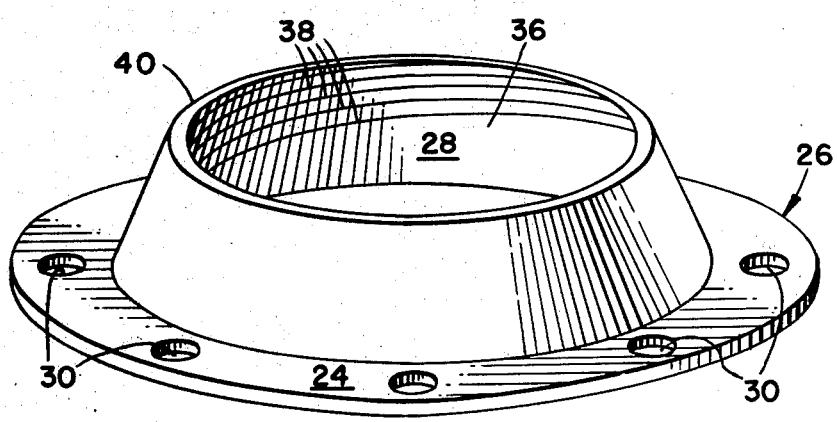
FIG. 4 is an end elevation view of the polytetrafluoroethylene washer or wafer constituting the main seal lip in accordance with the invention and prior to its insertion in the mold cavity.

FIG. 4 illustrates the polytetrafluoroethylene seal element 26 prior to assembly in the mold to the case. As such it is simply an annular frustoconically shaped disc with a plurality of holes spaced about the radially outermost portion. The most convenient method of manufacturing would be to stamp the annular disc from sheet stock and in the same operation to pierce the holes 30. The spiral groove 38 may, during this same operation or subsequently, be coined. The frustoconical shape may likewise be imparted to the flat wafer by a suitable coining operation. The frustoconical performing could also be accomplished in the mold cavity, if desired.

Figure 5:
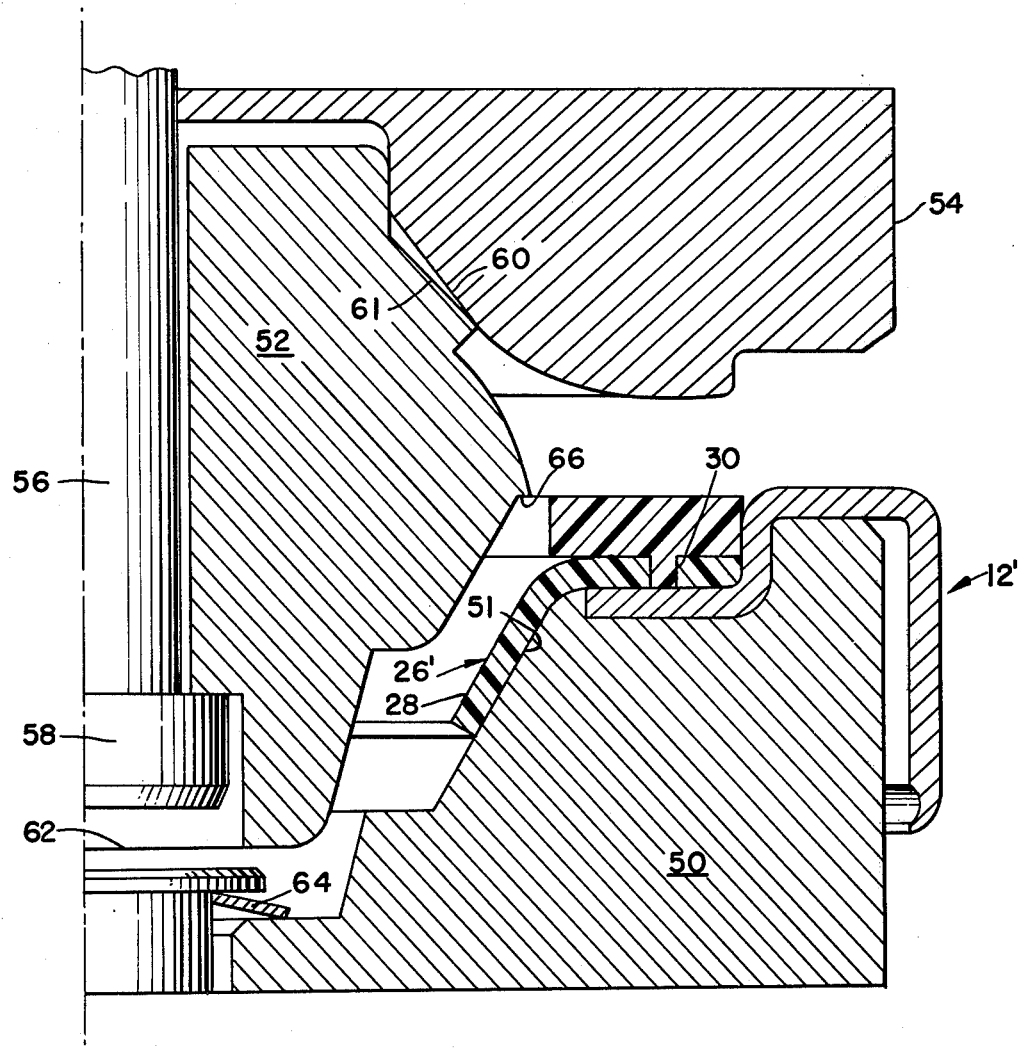
FIG. 5 is a view in elevation and section of the mold cavity with the seal elements located therein just prior to closing the mold and completing fabrication of the seal shown in FIG. 3 in accordance with the invention.

Assembly of the oil seal is accomplished in a mold such as shown in its fully open position in FIG. 5.

The mold assembly comprises the usual elements and arrangement thereof conventional to those used in the forming of molded elastomeric lip seals such as shown for example in U.S. Pat. No. 2,982,999 and includes lower mold 50, mold core 52, and upper mold 54, all of which when in the fully closed position define a cavity which determines to which areas of the seal the elastomeric prep material will flow. The mold core 52 is located on a cap screw 56 having a lower head portion 58 which arrests the mold core and upper mold. Lower mold 50 includes an upper portion which is shaped complementarily to that of the stepped metal case 12' so that the latter may be securely located with respect thereto during assembly. Upper mold 54 includes a shoulder portion 60 adapted to abut an adjacent portion 61 of mold core 52. The upper mold 54 and mold core are made of separate pieces primarily for ease of machining the complex shaped cavity portion. They may be considered as fixed relative to one another, however gas generated during the molding operation is allowed to escape from the mold cavity and out of the mold assembly by passing upwardly between surface portions 60 and 61. Shoulder screw 62 retains Belleville spring 64 which in turn allows alignment of the lower mold 50 with the mold core in the closed position.

The oil seal, which as shown in FIG. 5 is of the dual lip type depicted in FIG. 3, is assembled by first locating metal case 12' with seal element 26' and an annular elastomeric prep all situated within the stepped portion of the metal case on lower mold 50. Inner wall 51 of the lower die is shaped complementarily to the frustoconical portion 28 of the seal element so that when the mold is closed the respective elements of the seal will not be dislodged. The mold which operates at an elevated temperature equaling the cure temperature of the elastomeric prep is then closed. The prep flows through holes 30 in the seal element and forms a bond with the metal case at the intermediate axial portion and at the inner radial flange portion in the area of holes 30. If desired, mold core 52 may include a raised annular rib 66 which will coin the seal element and thereby eliminate elastomeric flash which might otherwise be present if the prep were to flow past that particular portion of the mold core which engages the radially outermost portion of the frustoconical portion 28.

As an alternative molding operation one may begin with a flat coined sealing element and coin or otherwise form the frustoconical shape of the sealing element in the mold simultaneous with the molding operation.

To those skilled in the art to which this invention relates, many other changes in construction and widely differing embodiments and applications of the invention will suggest themselves without departing from the spirit and scope of the invention. The disclosures and the description herein are purely illustrative and are not intended to be in any sense limiting.

We claim:

1. An oil seal adapted to be press fitted into a bore of a housing member through which a rotating shaft extends and wherein the seal is to be mounted on such shaft in interference fit therewith so as to exclude the passage of oil along the shaft comprising, a relatively rigid metal case means, a wafer-like seal element including an annular frustoconically shaped portion defining a seal lip at one end adapted for interference fit with a shaft, said wafer-like seal element being of uniform cross-sectional thickness and being of a non-elastomeric material other than metal and heatably unbondable thereto, a flange portion of said seal element being in juxtaposition with said case means, elastomeric bonding means for securing said seal element to the case means, said bonding means including a main body portion opposite the flange portion of said seal element from the case means, said flange portion of said seal element including a plurality of passages in and circumferentially spaced about the flange portion, and said elastomeric bonding means further including secondary portions extending from the main body portion and through each of said plurality of passages and being bonded to the case means whereby said seal element is fixed in place relative to the case means and is prevented from rotating relative thereto.

2. An oil seal as defined in claim 1. wherein:

said case means includes an outer cylindrical portion and a radial flange depending from one end thereof, said radial flange being of stepped configuration and including a lower radial portion, an intermediate cylindrical portion, and an upper radial portion, said lower radial portion and said intermediate cylindrical portion defining a counterbore, and said flange portion of wafer like seal element and said elastomeric bonding means being located within said counterbore.

3. An oil seal as defined in claim 1 further including a second seal lip means, said second seal lip means being of elastomeric material and of annular shape.

4. The oil seal of claim 3 wherein said second seal lip is integral with said elastomeric bonding element means, and is of frustoconical shape with the radially inwardmost end of said second seal lip means being directed in a direction axially opposite that of said seal element.

5. The oil seal as defined in either claim 1 wherein said seal element is polytetrafluoroethylene.

* * * * *